US009483520B1

(12) United States Patent
Reiner et al.

(10) Patent No.: US 9,483,520 B1
(45) Date of Patent: Nov. 1, 2016

(54) ANALYTIC DATA FOCUS REPRESENTATIONS FOR VISUALIZATION GENERATION IN AN INFORMATION PROCESSING SYSTEM

(71) Applicant: EMC Corporation, Hopkinton, MA (US)

(72) Inventors: David S. Reiner, Lexington, MA (US); David Dietrich, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 14/132,669

(22) Filed: Dec. 18, 2013

(51) Int. Cl.
G06F 17/30 (2006.01)

(52) U.S. Cl.
CPC ............................... *G06F 17/30386* (2013.01)

(58) Field of Classification Search
CPC ................................................. G06F 17/30386
USPC .......................................................... 707/736
See application file for complete search history.

(56) References Cited

U.S. PATENT DOCUMENTS

| | | | | |
|---|---|---|---|---|
| 8,281,238 B2* | 10/2012 | Sweeney | ........... | G06F 17/30731 715/273 |
| 8,793,285 B2* | 7/2014 | Han | ........... | G06F 17/218 707/803 |
| 8,954,428 B2* | 2/2015 | Chitiveli | ........... | G06F 17/30991 706/12 |
| 9,372,919 B2* | 6/2016 | Chitiveli | ........... | G06F 17/30991 |
| 2008/0072145 A1* | 3/2008 | Blanchard | ........... | G06F 17/22 715/273 |
| 2010/0070860 A1 | 3/2010 | Alkov et al. | | |
| 2010/0229082 A1 | 9/2010 | Karmarkar et al. | | |
| 2011/0029873 A1* | 2/2011 | Eseanu | ........... | G11B 27/105 715/719 |
| 2012/0005195 A1 | 1/2012 | Cain, Jr. et al. | | |
| 2012/0072435 A1* | 3/2012 | Han | ........... | G06F 17/241 707/754 |
| 2012/0290988 A1* | 11/2012 | Sun | ........... | G06F 17/30572 715/853 |

(Continued)

FOREIGN PATENT DOCUMENTS

| | | |
|---|---|---|
| EP | 2136301 A1 | 12/2009 |
| EP | 2575055 A1 | 4/2013 |
| GB | 2482415 A | 2/2012 |

OTHER PUBLICATIONS

Bateman, Scott, et al., "Seeing Things in the Clouds: The Effect of Visual Features on Tag Cloud Selections", HT '08, Pittsburgh, PA, Jun. 19-21, 2008, pp. 193-202.*

(Continued)

*Primary Examiner* — Robert Stevens
(74) *Attorney, Agent, or Firm* — Ryan, Mason & Lewis, LLP

(57) ABSTRACT

An analytics controller is configured for communication with one or more data sources. The analytics controller comprises an analytic data focus representation module and a visualization generator coupled to the analytic data focus representation module, with the analytic data focus representation module being configured to derive a plurality of analytic data focus representations from the one or more data sources, and the visualization generator being configured to generate visualizations based at least in part on the analytic data focus representations. At least one of the analytic data focus representation module and the visualization generator may be further configured to establish a plurality of linkages with each such linkage associating one or more of the representations with one or more of the visualizations. The analytics controller may be part of a data management system implemented using one or more processing devices of a processing platform.

20 Claims, 4 Drawing Sheets

(56) References Cited

U.S. PATENT DOCUMENTS

| | | |
|---|---|---|
| 2013/0007661 A1 | 1/2013 | Klappert et al. |
| 2013/0047097 A1 | 2/2013 | Stephens |
| 2013/0073336 A1* | 3/2013 | Heath ............... G06Q 30/02 705/7.29 |
| 2013/0227484 A1 | 8/2013 | Bastide et al. |
| 2013/0254406 A1 | 9/2013 | Augenstein et al. |
| 2013/0268357 A1* | 10/2013 | Heath ............... H04L 63/00 705/14.53 |
| 2014/0195531 A1* | 7/2014 | Diament ........... G06F 17/30716 707/736 |
| 2014/0195534 A1* | 7/2014 | Diament ........... G06F 17/30705 707/737 |
| 2014/0195950 A1* | 7/2014 | Diament ........... G06F 17/30716 715/771 |
| 2015/0067565 A1* | 3/2015 | Yan .................. G06F 3/0484 715/771 |

OTHER PUBLICATIONS

Buffa, Michel, et al., "ISICIL: Semantics and Social Networks for Business Intelligence", SOFSEM 2013, Špindlerův Mlýn, Czech Republic, Jan. 26-31, 2013, pp. 67-85.*
Burch, Michael, et al., "Prefix Tag Clouds", IV 2013, London, UK, Jul. 16-18, 2003, pp. 45-50.*
Burns, Michael J., et al., "A Multidimensional Approach to Characterizing and Visualizing Latent Relationships in Enterprise Social Networks", Bell Labs Technical Journal, vol. 17, Issue 1, Jun. 2012, pp. 201-217.*
Collins, Christopher, et al., "VisLink: Revealing Relationships Amongst Visualizations", IEEE Transactions on Visualizations and Computer Graphics, vol. 13, No. 6, Nov./Dec. 2007, pp. 1192-1199.*
Deutsch, Stephanie, et al., "Comparing Different Layouts of Tag Clouds: Findings on Visual Perception", HCIV (INTERACT) 2009, LNCS 6431, IFIP International Federation for Information Processing, © 2011, pp. 27-37.*
Di Caro, Luigi, et al., "Navigating within news collections using tag-flakes", Journal of Visual Languages and Computing, vol. 22, Issue 2, Apr. 2011, pp. 120-139.*
Dykes, Jason, et al., "Exploring Volunteered Geographic Information to Describe Place: Visualization of the 'Geograph British Isles' Collection", Proc. of the GIS Research UK 1th Annual Conf. GUSRUK, © 2008, pp. 256-267.*
Emerson, Jessica, et al., "From Toy to Tool: Extending Tag Clouds for Software and Information Visualisation", ASWEC 2013, Melbourne, VIC, Australia, Jun. 4-7, 2013, pp. 155-164.*
Gou, Liang, et al., "Tagnet: Supporting the Exploration of Knowledge Structures of Social Tags with Multiscale Network Visualization", International Journal of Intelligence, vol. 3, No. 1, Mar. 2011, AIA International Advanced Information Institute, pp. 67-93.*
Javed, Waqas, et al., "Exploring the Design Space of Composite Visualization", IEEE Pacific Visualization Symposium 2012, Songdo, Korea, Feb. 28-Mar. 2, 2012, pp. 1-8.*
Kaser, Owen, et al., "Tag-Cloud Drawing: Algorithms for Cloud Visualization", WWW 2007, Banff, Canada, May 8-12, 2007, pp. 1-10.*
Liu, Xiaotong, et al., "CompactMap: A Mental Map Preserving Visual Interface for Streaming Text Data", Big Data 2013, Silicon Valley, CA, Oct. 6-9, 2013, pp. 48-55.*
Lohmann, Steffen, et al., "Comparison of Tag Cloud Layouts: Task-Related Performance and Visual Exploration", INTERACT 2009, Part I, LNCS 5726, International Federation for Information Processing, © 2009, pp. 392-404.*
Sánchez-Zamora, Fernando, et al., "FIE 2009", AUTO '93, Antonio, TX, Oct. 18-21, 2009, pp. W2A-1-W2A-6.*
Supek, Fran, et al., "REVIGO Summarizes and Visualizes Long Lists of Gene Ontology Terms", PLoS ONE, vol. 6, Issue 7, Jul. 2011, pp. 1-9.*
Viégas, Fernanda B., et al., "Many Eyes: A Site for Visualization at Internet Scale", IEEE Transactions on Visualization and Computer Graphics, vol. 13, No. 6, Nov./Dec. 2007, pp. 1121-1128.*
Wang, Ji, "Clustered Layout Word Cloud for User Generated Online Reviews", AUTO '93, Master of Science in Computer Science and Applications Thesis, Virginia Polytechnic Institute and State University, Blacksburg, VA, Oct. 25, 2012, 70 pages.*
Xu, Weijia, et al., "Analysis of Large Digital Collections with Interactive Visualization", IEEE Symposium on Visual Analytics, Science and Technology, Providence, RI, Oct. 23-28, 2011, pp. 241-250.*
Aouiche, Kamel, et al., "Web 2.0 OLAP: From Data Cubes to Tag Clouds", WEBIST 2008, LNBIP 18, Springer-Verlag, Berlin, Germany, © 2009, pp. 51-64.*
Kim, Kyung Tae, et al., "WordBridge: Using Composite Tag Clouds in Node-Link Diagrams for Visualizing Content and Relations in Text Corpora", HICSS 2011, Koloa, Kauai, Hawaii, Jan. 4-7, 2011, 8 pages.*
Riabov, Anton V., et al., "Wishful Search: Interactive Composition of Data Mashups", WWW 2008 / Refereed Track: Web Engineering—Web Service Composition, Beijing, China, Apr. 21-25, 2008, pp. 775-784.*
Cui, Weiwei, et al., "Context Preserving Dynamic Word Cloud Visualization", PacificVis 2010, Taipei, Taiwan, Mar. 2-5, 2010, pp. 121-128.*
Lohmann, Steffen, et al., "Visual Analysis of Microblog Content Using Time-Varying Co-occurrence Highlighting in Tag Clouds", AVI '12, Capri Island, Italy, May 21-25, 2012, pp. 753-756.*
Lee, Bongshin, et al., "SparkClouds: Visualizing Trends in Tag Clouds", IEEE Transactions on Visualization and Computer Graphics, vol. 16, No. 6, Nov./Dec. 2010, pp. 1182-1189.*
Fujimara, Ko, et al., "Topigraphy: Visualization for Large-scale Tag Clouds", WWW 2008 / Poster Paper, Beijing, China, Apr. 21-25, 2008, pp. 1087-1088.*
U.S. Appl. No. 13/336,613 filed in the name of D.S. Reiner et al. On Dec. 23, 2011 and entitled "Managing Data Sets by Reasoning Over Captured Metadata." 26 pages.

* cited by examiner

ANALYTIC DATA FOCUS REPRESENTATIONS FOR VISUALIZATION GENERATION IN AN INFORMATION PROCESSING SYSTEM

FIELD

The field relates generally to information processing systems, and more particularly to data analytics techniques utilized within such systems.

BACKGROUND

A wide variety of different types of visualizations are utilized in conjunction with data analytics in information processing systems. For example, such visualizations include so-called "tag clouds." In a typical tag cloud, multiple words or other text strings are simultaneously displayed, each with a size in proportion to its frequency of occurrence in a document, file or other collection of textual data. Conventional tag clouds of this type are commonly used to represent text strings resident in web sites, academic papers, conference proceedings, tweets, blog posts, emails and other textual data sources.

A significant drawback of conventional tag clouds is that they represent the textual data in a seemingly random way within a given space or other display area. Typically, textual data is shown with the size of each text string proportional only to its occurrence frequency. Such an approach is particularly problematic when the number of documents or other textual data sources becomes large, in which case the resulting tag cloud conveys little information and can become very difficult to read, thereby undermining its usefulness as an analytical tool. Unfortunately, this can render conventional tag clouds unsuitable for use in the context of "big data" analytics challenges faced by enterprises in processing complex data sources.

SUMMARY

Illustrative embodiments of the present invention provide techniques for generation of analytic data focus representations. Such representations permit the generation of enhanced tag clouds and other types of visualizations that provide significant advantages relative to the conventional arrangements described above. For example, the analytic data focus representations can be used to generate what are referred to herein as "generalized tag cloud visualizations" or GTCVs that provide highly useful analytic tools even for the complex data sources typically associated with "big data" analytics. Thus, improved data analysis can be provided for enterprise business units, such as marketing, human resources and finance, which analyze extensive data associated with relatively complex entities such as customers, employees and product lines, and in a wide variety of other contexts.

In one embodiment, an analytics controller is configured for communication with one or more data sources. The analytics controller comprises an analytic data focus representation module and a visualization generator coupled to the analytic data focus representation module, with the analytic data focus representation module being configured to derive a plurality of analytic data focus representations from the one or more data sources, and the visualization generator being configured to generate visualizations based at least in part on the analytic data focus representations. At least one of the analytic data focus representation module and the visualization generator may be further configured to establish a plurality of linkages with each such linkage associating one or more of the representations with one or more of the visualizations. The analytics controller may be part of a data management system implemented using one or more processing devices of a processing platform.

By way of example, the visualizations provided by the visualization generator based at least in part on the analytic data focus representations may comprise one or more generalized tag cloud visualizations, with a given visualization element of the generalized tag cloud visualization illustratively having at least one characteristic that is determined based on multiple informational dimensions of a corresponding set of one or more informational elements of at least one of the analytic data focus representations.

Such characteristics may include, for example, one or more of an orientation of the visualization element, a color of the visualization element, a font of the visualization element, and a distance of the visualization element from one or more other visualization elements, although numerous other arrangements of one or more distinct characteristics may be used in rendering the visualization element.

The multiple informational dimensions may include one or more of a classification, a clustering, a derivation, an observed metric and a computable metric of the set of one or more informational elements, and need not include a frequency of occurrence of the set of one or more informational elements in the one or more data sources.

It is also possible for a given visualization element of the tag cloud visualization to have at least one characteristic that is determined based on a logic function of one or more sets of one or more informational elements of at least one of the analytic data focus representations.

Additionally or alternatively, a given informational element of at least one of the analytic data focus representations may itself be determined based on a logic function of at least one of: (i) one or more other informational elements of the same analytic data focus representation(s) or one or more other analytic data focus representations; and (ii) one or more other informational elements of the one or more data sources.

The analytic data focus representations in the illustrative embodiments advantageously facilitate data manipulation and analytic comparisons and enable new types of visualizations. In the context of tag clouds, for example, the above-described conventional literal association of tag cloud elements with respective text strings and their occurrence frequencies is broken through creation of an analytic data focus representation that can be described and transformed independently of its visualization aspects.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated analytics controllers each implemented using one or more processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination. The term "analytics controller" is also intended to be broadly construed so as to encompass a variety of different arrangements for deriving analytic data focus representations and generating associated visualizations based at least in part on those representations. The term "deriving" in this context is intended to encompass functionality such as creating, maintaining and modifying analytic data focus representations.

Figure 1:
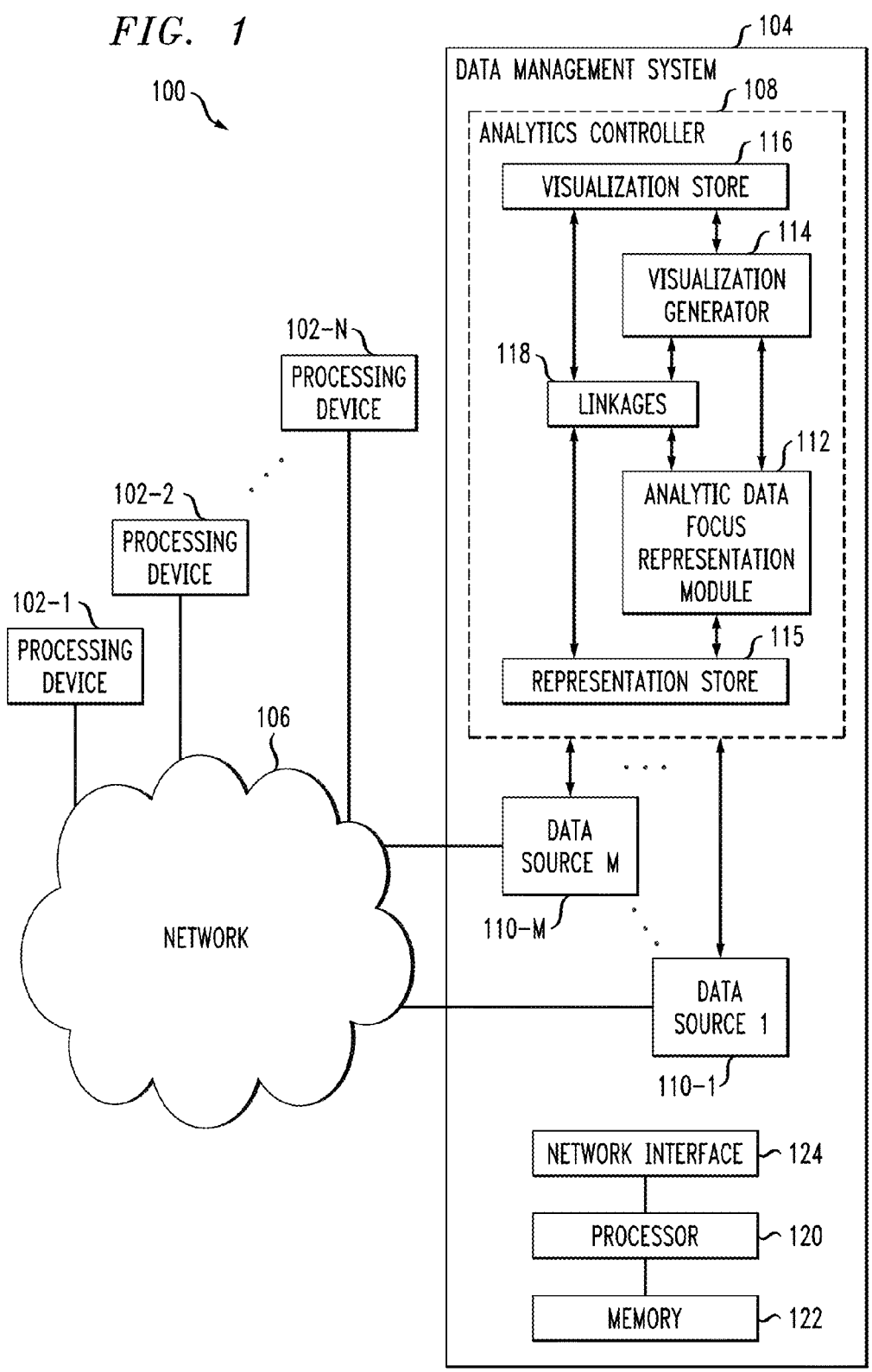
FIG. 1 is a block diagram of an information processing system comprising a data management system with functionality for generating visualizations based on analytic data focus representations in an illustrative embodiment of the invention.

FIG. 1 shows an information processing system 100 configured in accordance with an illustrative embodiment of the present invention. The information processing system 100 comprises a plurality of processing devices 102-1, 102-2, ... 102-N and a data management system 104 that communicate with one another over a network 106. The data management system 104 comprises an analytics controller 108 and a plurality of data sources 110-1, 110-2, ... 110-M coupled to the analytics controller 108. The analytics controller 108 comprises an analytic data focus representation module 112 and a visualization generator 114 that is coupled to the analytic data focus representation module 112. The analytic data focus representation module 112 is configured to derive analytic data focus representations from one or more of the data sources 110, and the visualization generator 114 is configured to generate visualizations based at least in part on the analytic data focus representations.

The analytic data focus representations, also referred to herein as ADFRs, are stored by the analytics controller 108 in a representation store 115 coupled to module 112. Such representations illustratively comprise respective intermediate multidimensional representations, utilized in bridging the data sources 110 and the visualization generator 114, as will be described in more detail below.

The visualizations generated by the visualization generator 114 illustratively include one or more generalized tag cloud visualizations or GTCVs, and are stored by the visualization generator 114 in a visualization store 116. Examples of GTCVs will be described below in conjunction with FIGS. 3A and 3B.

The analytic data focus representation module 112 is further configured to establish a plurality of linkages 118 with each such linkage associating one or more of the representations with one or more of the visualizations. These linkages 118 are accessible to both the module 112 and the visualization generator 114 as indicated in the figure, although different change propagation modes for linkages and associated representations and visualizations may be used in the analytics controller 108.

The representation store 115, visualization store 116 and associated linkages 118 may be implemented using respective portions of an analytic data store or other arrangements of one or more data stores. Such data stores may additionally encompass at least portions of the data sources 110. A given analytic data store utilized in one or more embodiments of the invention may be implemented at least in part utilizing Greenplum, commercially available from the Greenplum division of EMC Corporation. Other examples of data stores that may be used in embodiments of the invention include low-latency data stores such as SQLFire and GemFire, both commercially available from VMware.

However, these are just examples of possible data store implementations, and numerous other data management products may be used to implement the data management system 104 and analytics controller 108 in other embodiments. For example, possible alternatives to Greenplum for implementing an analytic data store include Hadoop file system, Hive, Teradata, Couchbase, Netezza and others, as will be readily appreciated by those skilled in the art.

The data sources 110 illustratively store data in the form of data sets, although other types of data storage can be used. A "data set" as the term is generally used herein may be viewed as an abstraction of one or more data items, such as a table, document, file, query result, key-value pairs, index, storage block contents, in-memory caches or other data item or combinations thereof, where the given data set is characterized by properties as well as relationships to other data sets. These properties and relationships are captured by metadata that is associated with the data set in the data sources 110.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata," which is commonly assigned herewith and incorporated by reference herein.

Although the data sources 110 are shown in the FIG. 1 embodiment as being implemented within the data management system 104, in other embodiments at least a subset of the data sources 110 may be implemented at least in part externally to the data management system 104. For example, it is possible to implement a given data source using one or more of the processing devices 102 external to the data management system 104. A given "data source" as that term is broadly used herein may itself comprise, for example, a database management system (DBMS) or other type of data set management system, data repository or, more generally, data management system.

Also, although shown as elements of the analytics controller 108 within data management system 104 in the FIG. 1 embodiment, at least portions of the representation store 115, visualization store 116 and linkages 118 may be implemented externally to the analytics controller 108 or data management system 104 in other embodiments.

The data management system 104 in the present embodiment further comprises a processor 120, a memory 122 and a network interface 124. These are assumed to be elements of at least one processing device. The data management system 104 is therefore implemented in the FIG. 1 embodiment using at least one processing device comprising a processor coupled to a memory.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interfaces 124 comprise network interface circuitry that allows the data management system 104 to communicate over the network 106 with the other processing devices 102 of the information processing system 100. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

At least a portion of the analytics controller 108 may comprise software that is stored in memory 122 and executed by processor 120.

Each of the processing devices 102 may similarly incorporate processor, memory and network interface elements of the type described above.

The data management system 104 and the processing devices 102 may comprise a common processing platform or multiple separate processing platforms. Such processing platforms can include virtual machines implemented using one or more hypervisors running on underlying physical infrastructure. Although shown as separate from the processing devices 102 in the present embodiment, the data management system 104 may be implemented at least in part using one or more such processing devices.

It should be understood that the particular sets of modules and other components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the system 100 will now be described in greater detail with reference to the flow diagram of FIG. 2, which illustrates an exemplary process performed by the analytics controller 108 of the data management system 104 in one embodiment. The process as shown includes steps 200 through 208. Step 200 is assumed to be performed primarily by the analytic data focus representation module 112, step 202 is assumed to be performed primarily by the visualization generator 114, and steps 204, 206 and 208 are assumed to be performed by one or both of the analytic data focus representation module 112 and the visualization generator 114, although one or more of these exemplary steps may be performed at least in part by other components of analytics controller 108, data management system 104 or information processing system 100 in other embodiments.

In step 200, the analytic data focus representation module 112 derives analytic data focus representations from one or more of the data sources 110. The resulting analytic data focus representations are stored in the representation store 115. As indicated previously, the term "derives" in this context is intended to be broadly construed and may encompass additional operations subsequent to an initial derivation, such as maintaining and modifying analytic data focus representations.

A wide variety of different types and arrangements of data sources may be used. For example, one or more of the processing devices 102 external to the data management system 104 may serve as data sources in generating one or more analytic data focus representations in the module 112. Additionally or alternatively, a given one of the analytic data focus representations may itself serve as a data source utilized in the derivation of at least one other analytic data focus representation.

In step 202, the visualization generator 114 generates visualizations each based at least in part on one or more of the analytic data focus representations. The resulting visualizations are stored in the visualization store 116. Such visualizations are additionally or alternatively presented to users via display devices associated with the data management system 104 or processing devices 102. The display devices may comprise laptop, desktop or tablet computers, mobile telephones or other types of user devices that incorporate display screens suitable for viewing visualizations.

As noted above, the visualizations generated in step 202 based at least in part on the analytic data focus representations may comprise one or more generalized tag cloud visualizations, with a given visualization element of the generalized tag cloud visualization illustratively having at least one characteristic that is determined based on multiple informational dimensions of a corresponding set of one or more informational elements of at least one of the analytic data focus representations.

Such characteristics may include, for example, one or more of an orientation of the visualization element, a color of the visualization element, a font of the visualization element, and a distance of the visualization element from one or more other visualization elements, although numerous other arrangements of one or more distinct characteristics may be used in rendering the visualization element. The visualization elements in the context of tag cloud visualizations are also referred to herein as "tag cloud elements" or simply as "tags." It should be appreciated that the term "cloud" in this context does not relate to cloud computing, but instead refers to a type of visualization comprising a plurality of visualization elements.

The multiple informational dimensions may include one or more of a classification, a clustering, a derivation, an observed metric and a computable metric of the set of one or more informational elements, and need not include a frequency of occurrence of the set of one or more informational elements in the one or more data sources.

Accordingly, in some embodiments, the conventional literal association of tag cloud elements with respective text strings and their occurrence frequencies is broken through creation of an analytic data focus representation that can be described and transformed independently of its visualization aspects. Such an arrangement advantageously facilitates data manipulation and analytic comparisons and enables new types of visualizations.

Although the resulting visualizations in these embodiments need not include any dependence on frequency of occurrence of particular informational elements, other types of visualizations generated herein may include some dependence on frequency of occurrence in combination with dependence on other informational dimensions completely unrelated to frequency of occurrence.

As another example, a given visualization element of the tag cloud visualization may have at least one characteristic that is determined based on a logic function of one or more sets of one or more informational elements of at least one of the analytic data focus representations.

It should be noted in this regard that a given informational element of at least one of the analytic data focus representations may itself be determined based on a logic function of at least one of: (i) one or more other informational elements of the same analytic data focus representation(s) or one or more other analytic data focus representations; and (ii) one or more other informational elements of the one or more data sources.

These and other features of exemplary analytic data focus representations will be described in more detail below in conjunction with FIGS. 3A, 3B and 4. It should be appreciated in this regard that embodiments of the invention are not limited to use with the generalized tag cloud visualizations to be described, but can more generally utilize a wide variety of other visualizations based on analytic data focus representations each derived from one or more data sources.

Referring again to FIG. 2, step 204 is performed by at least one of the analytic data focus representation module 112 and the visualization generator 114, and involves storing one or more linkages 118 with each such linkage associating one or more of the representations with one or more of the visualizations.

In step 206, at least one of the analytic data focus representation module 112 and the visualization generator 114 monitors changes to representation specifications and visualization specifications.

In step 208, at least one of the analytic data focus representation module 112 and the visualization generator 114 updates one or more of the representations, visualizations and linkages based on changes detected in step 206. This may involve, for example, configuring the analytic data focus representations to incorporate one or more of lineage, provenance and traceability information relating to the one or more data sources from which it is derived and the one or more visualizations with which it is associated. This would allow the analytic data focus representations to be traced to a particular time, version, or change of state, thereby facilitating an understanding of the transformations applied to generate the corresponding visualizations.

Other embodiments may alternatively involve monitoring and updating only one of the representation specifications and the visualization specifications.

Examples of various types of monitoring and updating that may be performed in or in conjunction with steps 206 and 208 include responding to a change in a specification of a given one of the analytic data focus representations by accessing the one or more data sources from which the given analytic data focus representation is derived, responding to a change in the specification of the given one of the analytic data focus representations by implementing corresponding changes in one or more of the visualizations linked to the given analytic data focus representation, and responding to a change in a specification of a given one of the visualizations by implementing corresponding changes in one or more of the analytic data focus representations linked to the given visualization. Additionally or alternatively, the monitoring and updating in steps 206 and 208 may involve responding to a change in at least one of the specification of the given analytic data focus representation and the specification of the given visualization by altering at least one linkage associating one or more of the representations with one or more of the visualizations.

Figure 2:
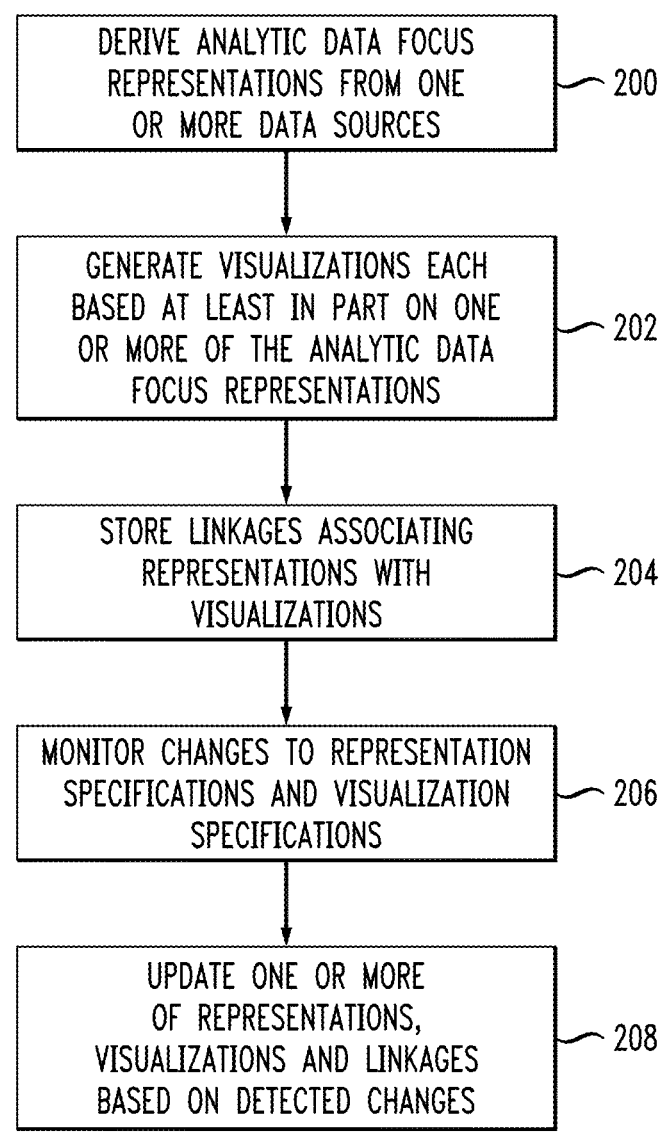
FIG. 2 is a flow diagram of an exemplary data analytics process implemented in the information processing system of FIG. 1.

Numerous other types of monitoring and updating involving one or more representations, visualizations, linkages or their corresponding specifications may be performed in the process of FIG. 2.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing visualization generation based on analytic data focus representations in system 100. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer. As mentioned previously, a memory or other storage device having such program code embodied therein is an example of what is more generally referred to herein as a "processor-readable storage medium."

Additional details of illustrative embodiments will now be further described with reference to generalized tag cloud visualizations, also referred to herein as GTCVs. Such GTCVs are generated based at least in part on exemplary analytic data focus representations referred to herein as generalized tag cloud objects or GTCOs. These embodiments are considered examples of the above-noted arrangements in which the conventional literal association of tag cloud elements with respective text strings and their occurrence frequencies is broken through creation of an analytic data focus representation that can be described and transformed independently of its visualization aspects. As mentioned previously, such arrangements advantageously facilitate data manipulation and analytic comparisons and enable new types of visualizations. It is to be appreciated that the features described in conjunction with these GTCO and GTCV examples can be extended in a straightforward manner to more general types of analytic data focus representations and associated visualizations. The term "analytic data focus representation" should therefore be understood to encompass not only GTCOs, but also a wide variety of other types of representations suitable for use in providing functionality of the type described herein.

The GTCOs are advantageously configured in one or more of these embodiments to describe not just literal content of the data sources 110, but also conversations, interests, interactions, histories, goal states and other salient attributes of complex entities such as customers, employees, purchases and prior experiences. GTCOs thus represent complex objects that can be constructed, manipulated, compared, analyzed and visualized. A given GTCO can be represented, for example, as a set of {key,value} pairs within a Hadoop, NoSQL, or structured DBMS environment. Such representations can utilize various implementation approaches to dealing with hierarchies within objects, including hierarchical key spaces and nested set models, where hierarchies within objects may include, for instance, departmental hierarchies within corporate customers in a business-to-business (B2B) analysis.

As more particular examples, customer profiles represented as GTCOs could be matched with cross-sell and up-sell offers to increase revenue, loyal customers could be compared with defecting customers to reduce churn, employees could be compared with the most productive employees to identify opportunities for improvement, marketing campaigns could be compared based on customer actions, and customer experiences could be compared to corporate goals to improve the total customer experience. Additionally, textual comments could be analyzed from source code management systems to identify the most influential and active engineers in a given team, or from human resources performance appraisals to understand the relationship of specific types of tokens or text strings to performance ratings and outcomes. For recruiting applications, the system could be configured to automate the comparison of applicant resume GTCOs with position or job requisition GTCOs.

It is also possible to add semantic classifications and derivations to GTCOs. Examples of classifications include recency, frequency, monetary value and type of product, service or interaction. Examples of derivations include textual stemming and lemmatization, language translation and net present value computations. These added classifications and derivations support improved and more robust GTCO analyses and comparisons. In addition to or in place of one or both of classifications and derivations, data clustering may be used. For example, visualization elements generated from a GTCO could represent membership in a specific cluster of data.

In these and other examples, any observed or computable metric of the GTCO can be used to replace frequency of occurrence of an informational element in order to determine visual size or other characteristics of one or more tags of a GTCV. As more particular examples, various visualization elements of the GTCV can represent:

1. Statistical function-based metrics, such as average customer satisfaction of a target customer population such as loyal customers or customers with a history of high customer satisfaction. Other averages or alternative statistical function-based metrics such as min, max, median and mode may be used.

2. Threshold-based metrics, such as performance of a business unit relative to a profitability threshold, revenue threshold, probability threshold or other threshold.

3. Binary-based metrics, such as a binary characterization of presence or absence of a particular characteristic, which may be used to characterize customers in terms of churn risk, ability to provide a reliable reference, and other factors.

Moreover, additional GTCO metrics can be reflected through orientation of tags in a GTCV, the distances among them, and their colors and fonts. In this context, the term "font" is intended to be broadly construed so as to encompass features such as underlining, bold, italics and so on. For example, if customer names are used as respective visualization elements in a GTCV, then the degree of tilt away from horizontal could represent propensity to defect to a competitor. An appropriate modification to the GTCV rendering can allow color palettes to be applied to the visualization elements, representing informational dimensions such as customer influence. Numerous other characteristics of visualization elements of a GTCV can be varied based on one or more underlying GTCOs.

In some embodiments, GTCOs are configured such that visualization elements of the corresponding GTCVs represent various logic functions of one or more sets of one or more informational elements. For example, GTCOs can be configured such that visualization elements of the corresponding GTCVs represent any combination of Boolean operations of multiple data sets in an analytic workspace.

Examples of Boolean operations that may be applied in this context and other logic function contexts herein include operations that utilize common Boolean operators such as union, intersection, AND, OR, NOT or XOR, as well as operations comprising combinations of these and possibly other Boolean operators.

As a more particular example of such an arrangement, a user could define GTCOs that represent the union of multiple data sets in an analytic workspace, such as customer revenue and buying patterns. Based on this data, with customer names as visualization elements and with priority of the vertical market determining the size of those elements, the names of the most profitable customers, or the ones most likely to purchase a given product next, are highlighted in the GTCV. Arrangements of this type can be used to refine analytical campaigns and focus the efforts of a product team.

It is also possible for the a GTCO to incorporate informational dimensions relating to customer online social presence, with the corresponding GTCV showing which customers have the most influence over other corporate customers. This involves determining customer social media presence in terms of what the customers talk about when they talk about the corporation or its products through social media. The most positive customers for a corporation may be the ones who influence other prospects to become buyers, or other buyers to become repeat buyers, even if the customer that is providing this influence is not actually a "top n" most valuable customer based on yearly spend. Compared to traditional analytic methods, this would help to unearth and visualize valuable customers who are otherwise hidden to the corporation, with visualization possibly being aided by the color palette or other GTCV characteristics as described above. For various marketing events and forums, related analyses could help corporations to understand, in near real time, which experts or executives drive the most media attention, or which marketing campaigns or tactics are the most valuable based on metrics such as reach, lift and customer actions.

Once GTCOs are populated in the manner described above, analytic tools can be applied across multiple GTCOs to identify principle components, compute clusters, recommend segments, detect correlations and build predictive models. One or more such functionalities can be provided as a service in the system 100.

The above-described exemplary GTCO configurations support GTCVs that can aid business analysts and data scientists in visualizing very complex data comparisons. These embodiments can complement existing analytic techniques while adding a strong visualization aspect to such techniques. Presentations of GTCVs based on underlying GCTOs are also "executive-friendly" and therefore well suited for use by business analysts and data scientists in explaining analytic insights and justifying further actions.

GTCOs and the associated GTCVs could be used directly by business units, such as marketing, human resources and finance, which analyze extensive data associated with relatively complex entities such as customers, employees and product lines, and in a wide variety of other contexts.

This functionality can be built into an information technology product such as an analytic workspace or "sandbox," possibly within software-as-a-service service offerings for business intelligence or business analytics, thereby assisting end users to be more self-sufficient in driving higher value "big data" analytics.

Figure 3A:
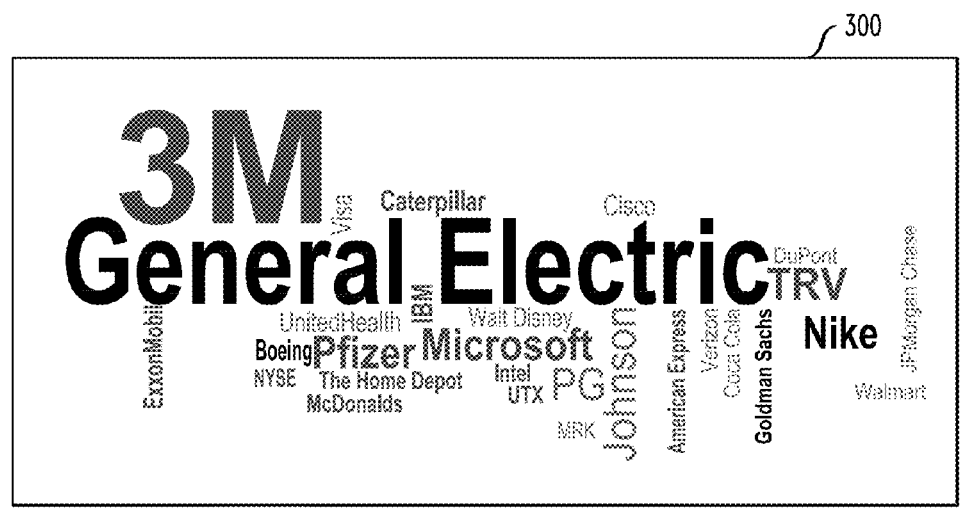
FIGS. 3A and 3B show respective examples of generalized tag cloud visualizations or GTCVs generated in the FIG. 1 system using the data analytics process of FIG. 2.

Referring now to FIG. 3A, an exemplary GTCV 300 generated by the visualization generator 114 of analytics controller 108 is shown. In this GTCV, the visualization elements comprise respective tags corresponding to the names of the 30 companies in the Dow Jones Industrial Average (DJIA), and the tag characteristics that are varied based on one or more underlying GTCOs include font size of the tag and shading of the tag. The tag shading is illustrated in the figure as varying gray scales but could alternatively be represented as different colors. Each tag comprises a text string indicating the name of an individual company in the 30 DJIA companies.

The GTCV 300 of FIG. 3A is configured for use by a given company undertaking a marketing campaign in order to determine the most appropriate customer targets for a particular product promotion. It is assumed that the given company is not itself in the DJIA but does business with all of the 30 companies of the DJIA. The font sizes of the tags in FIG. 3A represent respective account sizes of the corresponding customers in terms of annual revenue. For example, 3M and General Electric are assumed to be the largest customers of the given company in terms of annual revenue, and therefore the tags 3M and General Electric are shown as having the largest font size in the GTCV 300. In addition, the tags have different shadings which represent the propensities of the respective companies to purchase the product at issue, with a darker shading indicating a higher propensity to purchase the product. Thus, in this particular GTCV, the tags in black (e.g., General Electric, Nike and Boeing) have the highest propensity, the tags in dark gray (e.g., Pfizer and Microsoft) have a medium propensity, and the tags in light gray (e.g., DuPont and Disney) have the lowest propensity.

This exemplary GTCV allows the user to easily identify the optimal target or targets for the marketing campaign by presenting the tags using variation in tag font size and tag shading to represent respective account size and propensity. For example, the user can easily identify General Electric as a customer with relatively high annual account size and a relatively high propensity to purchase the product at issue.

Using this approach, results of various algorithmic operations can be applied to a new or existing GTCV in order to illustrate the results of propensity models, customer lifetime value, or many other attributes used to show characteristics about a set of tags, rather than just frequency of occurrence.

It should be understood that the particular GTCV 300 in FIG. 3A is exemplary only, and a wide variety of other types of visualizations can be generated using underlying GTCOs or other analytic data focus representations as disclosed herein.

By way of additional example, the GTCV 300 could be modified with the characteristics of the tags configured to vary based on industry group with each such group comprising one or more of the DJIA companies.

Figure 3B:
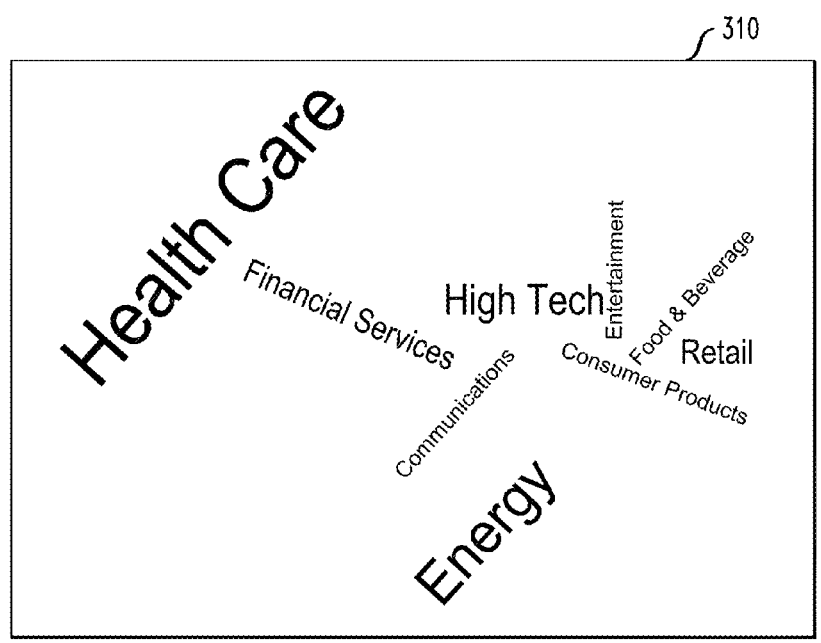

An exemplary arrangement of this type is the GTCV 310 illustrated in FIG. 3B. In this GTCV, the visualization elements comprise respective tags corresponding different industry groups into which the 30 DJIA companies can be categorized, and the tag characteristics that are varied based on one or more underlying GTCOs include font size of the tag, angle of the tag and distance relative to other tags. The tags of the GTCV 310 more particularly comprise respective text strings representing the 30 DJIA companies by industry group, rather than by individual company name as in the GTCV 300.

The font size of each tag in the GTCV 310 is assumed to be proportional to a compound annual growth rate (CAGR) of previous product sales to the underlying DJIA companies of the corresponding industry group for a designated period of time (e.g., 2012).

The angles of the tags represent the propensities of the respective industry groups to purchase the product at issue, with a greater upward angle indicating a higher propensity to purchase the product. Thus, in this particular GTCV, an upward vertical tag (i.e., Entertainment) indicates the industry group with the highest propensity, followed in descending order of propensity by upward angled tags (e.g., Health Care and Communications), horizontal tags (e.g., High Tech), and downward angled tags (e.g., Financial Services).

The distance between the tags represents the strength of common mention on Twitter of the underlying DJIA companies for a designated period of time (e.g., 1H 2013). Thus, tags that are closer together in the GTCV 310 indicate that the underlying DJIA companies of the corresponding industry groups have a greater number of instances of common mentions in Twitter postings than other industry groups for which the respective tags are further apart. Other social media such as Facebook could be used in addition to or in place of Twitter.

Additional informational dimensions could be indicated in the GTCV 310 through variations in other tag characteristics. For example, tag shading could be used to indicate a ratio of international to domestic sales for the underlying DJIA companies in a particular period of time (e.g., 1H 2013).

Other possible alternative GTCVs that may be generated in place of the GTCVs 300 or 310 described above could replace the tags indicating company names with tags indicating the CEOs of those companies, or tags indicating names of stock funds and marketing investments of the underlying stock holdings. These and numerous other variations will be apparent to those skilled in the art.

Figure 4:
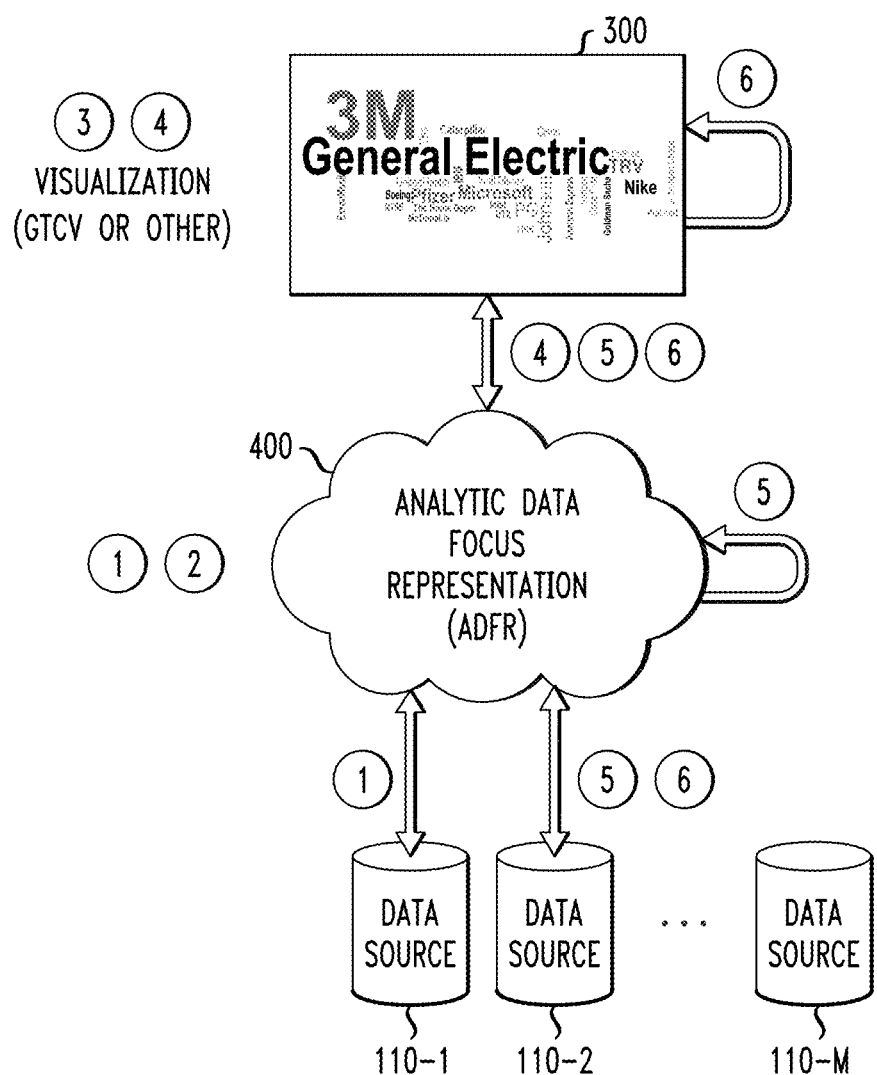
FIG. 4 is a diagram illustrating exemplary interactions between an analytic data focus representation, a corresponding generalized tag cloud visualization, and associated data sources in the FIG. 1 system.

FIG. 4 illustrates processing operations associated with the generation of the GTCV 300 of FIG. 3A in the analytics controller 108 of FIG. 1. More particularly, the diagram of FIG. 4 illustrates the interactions between an ADFR 400 that serves as an intermediate representation between the GTCV 300 and the data sources 110. The ADFR 400 is a multidimensional, updatable representation derived from one or more of the data sources 110 that is created and enhanced in the manner described elsewhere herein. The GTCV 300 is one possible visualization of the ADFR 400, but numerous other types of visualizations can be generated from the ADFR 400. It is also possible in some embodiments to utilize the ADFR 400 to provide outputs other than visualizations.

The diagram of FIG. 4 illustratively includes steps denoted as Steps 1 through 6, although additional or alternative steps can be used in other embodiments.

In Step 1, the ADFR 400 is derived from one or more of the data sources 110.

In Step 2, the ADFR 400 is enhanced using one or more generalizations relative to conventional tag clouds in the manner described previously.

In Step 3, the GTCV 300 is generated based at least in part on the ADFR 400.

In Step 4, the GTCV 300 is linked to the underlying ADFR 400.

In Step 5, changes are made to the ADFR 400, possibly through changes to its specification. Changes to the specification of the ADFR 400 may induce access to the data sources 110 and may induce corresponding changes in the linked GTCV 300.

In Step 6, changes are made to the GTCV 300, possibly through changes to its specification. Changes to the specification of the GTCV 300 may induce corresponding changes to the linked ADFR 400 and possibly access to the underlying data sources 110.

Although not specifically indicated in the figure, changes to ADFR 400 or GTCV 300 or respective specifications thereof can additionally or alternatively induce changes in one or more associated linkages.

It should be noted that certain steps described above may be performed at least in part in parallel with one another. For example, Step 5 and Step 6 may be performed in parallel with one another in some embodiments.

Operations similar to those illustrated in FIG. 4 for providing GTCV 300 of FIG. 3A can be used to provide the GTCV 310 of FIG. 3B.

Again, these particular operations and the associated ADFR, GTCV and linkage arrangements are exemplary only.

As indicated previously, functionality associated with generation of analytic data focus representations as disclosed herein can be implemented at least in part in the form of one or more software programs stored in memory and executed by a processor of a processing device such as a computer or a virtual machine.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, data management systems and associated data stores. In addition, the particular analytic data focus representations, visualizations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
an analytics controller configured for communication with one or more data sources;
wherein the analytics controller comprises:
an analytic data focus representation module; and
a visualization generator coupled to the analytic data focus representation module;
the analytic data focus representation module being configured to derive a plurality of analytic data focus representations from the one or more data sources;
the visualization generator being configured to generate visualizations based at least in part on the analytic data focus representations;
wherein the analytic data focus representations comprise respective intermediate, multidimensional and updatable representations bridging the one or more data sources with the visualizations, and describing multiple informational dimensions of a corresponding set of one or more informational elements;
wherein at least one of the analytic data focus representation module and the visualization generator is configured to establish a plurality of linkages with each such linkage associating one or more of the analytic data focus representations with one or more of the visualizations;
wherein the analytic data focus representation module is configured for:
responding to a change in a specification of a given one of the analytic data focus representations by accessing the one or more data sources from which the given analytic data focus representation is derived;
responding to a change in a specification of a given one of the analytic data focus representations by implementing corresponding changes in one or more of the visualizations linked to the given analytic data focus representation;
responding to a change in a specification of a given one of the visualizations by implementing corresponding changes in one or more of the analytic data focus representations linked to the given visualization; and
responding to a change in at least one of the specification of the given analytic data focus representation and the specification of the given visualization by altering at least one of the plurality of linkages associating one or more of the analytic data focus representations with one or more of the visualizations;
wherein the analytics controller is implemented using at least one processing device comprising a processor coupled to a memory; and
wherein the apparatus communicates with one or more other processing devices over at least one network.

2. The apparatus of claim 1 further comprising a data management system that incorporates the analytics controller.

3. The apparatus of claim 1 wherein the visualizations comprise one or more generalized tag cloud visualizations.

4. The apparatus of claim 3 wherein the visualization generator is further configured to determine at least one characteristic of a given visualization element of the generalized tag cloud visualization based on the multiple informational dimensions of the corresponding set of one or more-informational elements of at least one of the analytic data focus representations.

5. The apparatus of claim 4 wherein a given one of the multiple informational dimensions includes one of a classification, a clustering, a derivation, an observed metric and a computable metric of the set of one or more informational elements.

6. The apparatus of claim 4 wherein the multiple informational dimensions do not include a frequency of occurrence of the set of one or more informational elements in said one or more data sources.

7. The apparatus of claim 4 wherein said at least one characteristic of the given visualization element of the tag cloud visualization comprises one or more of an orientation of the visualization element, a color of the visualization element, a font of the visualization element, and a distance of the visualization element from one or more other visualization elements.

8. The apparatus of claim 3 wherein the visualization generator is further configured to determine at least one characteristic of a given visualization element of the generalized tag cloud visualization based on a processor implemented logic function of one or more sets of one or more informational elements of at least one of the analytic data focus representations.

9. The apparatus of claim 1 wherein at least one informational element of at least one of the analytic data focus representations is determined based on a processor implemented logic function of one or more other informational elements of the same analytic data focus representation(s) or one or more other analytic data focus representations.

10. The apparatus of claim 1 wherein at least one informational element of at least one of the analytic data focus representations is determined based on a processor implemented logic function of one or more other informational elements of the one or more data sources.

11. The apparatus of claim 1 wherein a given one of the analytic data focus representations incorporates one or more of lineage, provenance and traceability information relating to at least one of the one or more data sources from which it is derived and the one or more visualizations with which it is associated.

12. The apparatus of claim 1 wherein a given one of the analytic data focus representations serves as a data source for at least one other analytic data focus representation.

13. An information processing system comprising the apparatus of claim 1.

14. A method comprising:
deriving a plurality of analytic data focus representations from one or more data sources;
generating visualizations based at least in part on the analytic data focus representations; and
establishing a plurality of linkages with each such linkage associating one or more of the analytic data focus representations with one or more of the visualizations;
wherein the analytic data focus representations comprise respective intermediate, multidimensional and updatable representations bridging the one or more data sources with the visualizations, and describing multiple informational dimensions of a corresponding set of one or more informational elements;
wherein deriving a plurality of analytic data focus representations comprises:
responding to a change in a specification of a given one of the analytic data focus representations by accessing the one or more data sources from which the given analytic data focus representation is derived;
responding to a change in the specification of the given one of the analytic data focus representations by implementing corresponding changes in one or more of the visualizations linked to the given analytic data focus representation;
responding to a change in a specification of a given one of the visualizations by implementing corresponding changes in one or more of the analytic data focus representations linked to the given visualization; and
responding to a change in at least one of the specification of the given analytic data focus representation and the specification of the given visualization by altering at least one linkage associating one or more of the analytic data focus representations with one or more of the visualizations; and
wherein the deriving, generating and establishing are performed by at least one processing device comprising a processor coupled to a memory, and communicating with one or more other processing devices over at least one network.

15. The method of claim 14 wherein a given one of the multiple informational dimensions includes one of a classification, a clustering, a derivation, an observed metric and a computable metric of the set of one or more informational elements.

16. The method of claim 14 wherein a given one of the analytic data focus representations incorporates one or more of lineage, provenance and traceability information relating to at least one of the one or more data sources from which it is derived and the one or more visualizations with which it is associated.

17. The method of claim 14 wherein a given one of the analytic data focus representations serves as a data source for at least one other analytic data focus representation.

18. An article of manufacture comprising a processor-readable storage medium having encoded therein executable code of one or more software programs, wherein the one or more software programs when executed cause at least one processing device comprising a processor coupled to a memory to:
derive a plurality of analytic data focus representations from one or more data sources;
generate visualizations based at least in part on the analytic data focus representations; and
establish a plurality of linkages with each such linkage associating one or more of the analytic data focus representations with one or more of the visualizations;
wherein the analytic data focus representations comprise respective intermediate, multidimensional and updatable representations bridging the one or more data sources with the visualizations, and describing multiple informational dimensions of a corresponding set of one or more informational elements;
wherein deriving a plurality of analytic data focus representations comprises:
responding to a change in a specification of a given one of the analytic data focus representations by accessing the one or more data sources from which the given analytic data focus representation is derived;
responding to a change in the specification of the given one of the analytic data focus representations by implementing corresponding changes in one or more of the visualizations linked to the given analytic data focus representation;
responding to a change in a specification of a given one of the visualizations by implementing corresponding changes in one or more of the analytic data focus representations linked to the given visualization; and
responding to a change in at least one of the specification of the given analytic data focus representation and the specification of the given visualization by altering at least one linkage associating one or more of the analytic data focus representations with one or more of the visualizations; and
wherein the at least one processing device communicates with one or more other processing devices over at least one network.

19. The article of manufacture of claim 18 wherein a given one of the multiple informational dimensions includes one of a classification, a clustering, a derivation, an observed metric and a computable metric of the set of one or more informational elements.

20. The article of manufacture of claim 18 wherein a given one of the analytic data focus representations incorporates one or more of lineage, provenance and traceability information relating to at least one of the one or more data sources from which it is derived and the one or more visualizations with which it is associated.

* * * * *